UNITED STATES PATENT OFFICE.

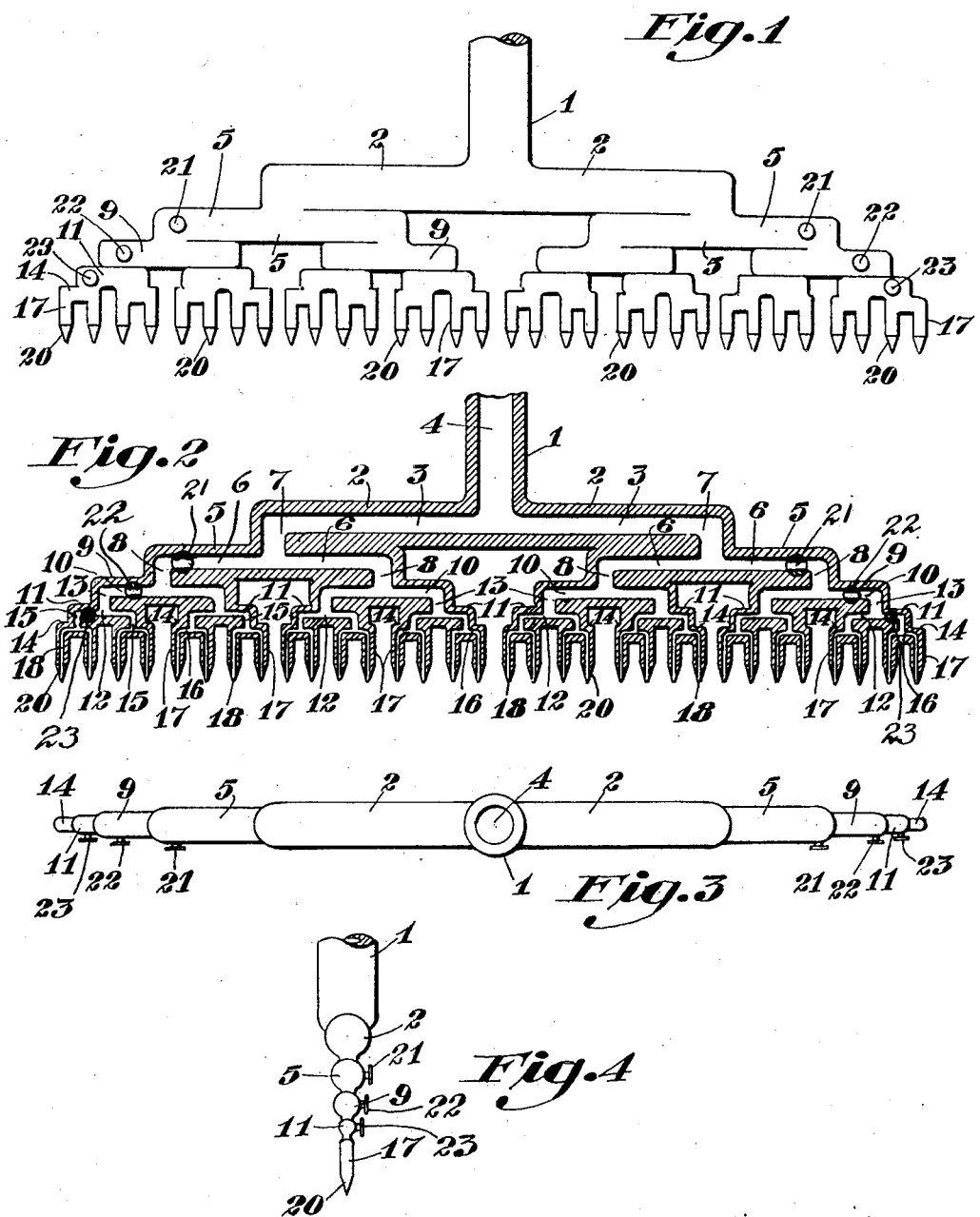
R. SYKORA.
FLUID DISTRIBUTING NOZZLE.
APPLICATION FILED JAN. 22, 1921.
1,409,259. Patented Mar. 14, 1922.

RUDOLF SYKORA, OF BOSTON, MASSACHUSETTS.

FLUID-DISTRIBUTING NOZZLE.

1,409,259.	Specification of Letters Patent.	Patented Mar. 14, 1922.

Original application filed February 11, 1920, Serial No. 357,778. Divided and this application filed January 22, 1921. Serial No. 439,253.

*To all whom it may concern:*

Be it known that I, RUDOLF SYKORA, a citizen of the United States, residing at Boston, county of Suffolk, Commonwealth of Massachusetts, have invented a certain new and useful Improvement in Fluid-Distributing Nozzles, of which the following is a specification, reference being had therein to the accompanying drawings.

The invention relates to a new and useful improvement in fluid distributing nozzles. This application is a division of an application for a coloring machine filed by me February 11, 1920, Serial No. 357,778. The object of the invention is to provide a nozzle system in which the fluid whether liquid or gaseous coming from a central source is equally divided and subdivided again and again until it finally issues from a plurality of small discharge orifices in minute streams or drops of uniform size, so that the fluid substance is finally deposited in a lineal direction at slightly separated points synchronously on the surface or into the container which is intended to receive the fluid substance. This is accomplished by an arrangement of subdivision, in which all the terminals are at equal distances from the point of first subdivision. Another object of the invention is to provide valves in the outermost branches of the various step-downs which can be independently controlled, so that the fluid substance may be delivered onto a wider or narrower surface as desired.

The invention will be fully understood from the following description when taken in connection with the accompanying drawings, and the novel features thereof will be pointed out and clearly defined in the claims at the close of this specification.

In the drawings, Fig. 1 is a front elevation of a device embodying the invention.

Fig. 2 is a vertical sectional view of the device shown in Fig. 1.

Fig. 3 is a plan view of the device shown in Fig. 1.

Fig. 4 is a side elevation.

Referring now to the drawings, the device is provided with a tubular stem 1 which is intended to be connected to its upper end with any suitable reservoir or main supply pipe. The upper end of the said stem 1 is shown broken away.

The lower end of the tubular stem 1 is connected with a step-down crosshead member midway of its length, having the right and left-hand arms 2—2, each of which has a passage 3 whose cross-sectional area is preferably one-half of the cross-sectional area of the passage 4 in the stem 1, so that as the fluid passes down out of the passage 4, it will be distributed equally to the two passages 3—3. By making these passages 3—3 each of one-half of the capacity of the main passage 4, the full volume of supply through the passage 4 will be taken care of without undue friction.

Connected with the lower side of the outer end portion of each of the two arms 2—2 is a step-down branch 5, the branches 5 being of equal length and each having right and left-hand arms with a passage 6 extending lengthwise of both arms. A passageway 7 leads from each end of the passageway 3 in the first branch arms 2—2 down into the passage 6 in the branches 5—5 midway of the length of each branch, so that the stream which passes through each step-down passage 7 into the passage 6 will be equally divided and flow into the right and left-hand portions of the several branch passages 6—6. The step-down passage 7 should have a cross-sectional area equal to the cross-sectional area of the passage 3, so as to avoid undue friction.

Each of the two branches 5—5 has a step-down connection 8 with two equal branches 9—9 near each end. This step-down connection 8 opens into the passage 10 in the branch 9 midway of the length of the passage 10, and the cross-sectional area of the step-down passage 8 is equal in capacity to that of the passage 6 and twice that of the passage through the branch 9. Thus while there are two of the first branches 5, this is subdivided into four of the further sub-branches 9. Each arm of each of the branches 9 is stepped-down to a branch 11 having a passage 12 with which it is connected midway thereof by a step-down passage 13. The step-down passage 13 should have a cross-sectional area equal in capacity to that of the passage 10 and twice that of the passage 11. It will be seen that there are eight of the branches 11.

Each branch 11 is stepped-down near each end thereof to connect with a branch 14 midway of said branch 14 and having a step-down passage 15 connected midway with the passage 16 in the branch 14. The cross-sectional area of the step-down passage 15 is equal to that of the passage 12 and twice that of the passage 16.

Each branch 14 has a downwardly extending connection 17 near each end, each of which has a passage 18 connected with the passage 16 in the horizontal branch member 14, the cross-sectional area of said passage 18 preferably being one-half that of the passage 16. There are thus thirty-two of the downwardly extending members 17.

The division and subdivision may be continued as many times as desired, making the stream for each branch portion smaller and smaller each time that it is stepped down, but the last step-down portion should terminate in the downwardly extending nozzle members 17, each of which has a minute passageway of such size as is necessary to allow the passage of the fluid in as minute quantities as desired.

Preferably the lower ends of the downwardly extending portions 17 terminate in tapered portions 20, the passageway 18 through the downwardly extending portion 17 being preferably of uniform size down to the discharge end.

By the construction and arrangement above described, all of the terminals are at equal distances from the point of first subdivision. Where the term "downwardly extending" has been used, it has been employed as a convenient way of describing the parts, assuming that the nozzle as a whole extends downwardly. It is to be understood however, that the device as a whole may be in any position and at any angle.

Preferably the outside arm of the first two step-down branches 5—5 is provided with a valve 21 so that if desired the fluid may be entirely shut off from the next step-down branches 9—9, thus completely shutting off the flow to all of the next divisions and subdivisions connected with the outside arms of the branches 5—5. This would permit cutting off of eight of the terminal nozzles on each end of the system and limiting the flow to the middle sixteen discharge nozzles.

Each outside arm of the step-down branches 9 is provided with a valve 22 so that if the valves 21—21 are left open the supply may be cut off from the four terminal nozzles at each end. The step-down branches 11 are each provided with a valve 23, so that the supply may be cut off from two terminal nozzles at each end. The several valves 21, 22, 23 should be of ample size to allow the full capacity of the respective passages in the arms 6, 10, 12 which they control. This valve arrangement enables the width of area of the final distribution to be reduced equally at each end of the system.

While I have described the device as being divided and subdivided until there are finally thirty-two terminal nozzles, it is obvious that the same principle may be applied to further division and subdivision as far as desired, or it may be made with only sixteen or even fewer nozzles.

By the form of construction described, it will be seen that the original stream flowing through the stem 4 is gradually divided and subdivided into smaller streams, each stream and substream being diminished in volume in arithmetical proportion, while the number of streams increases in arithmetical proportion and these several subdivided streams flow through different channels to the final discharge nozzle, all of the discharge terminals being at equal distances from the point of first subdivision.

What I claim is: —

1. A fluid distribution system comprising a central supply pipe, a hollow crosshead member with which said supply pipe is connected intermediate the ends of said crosshead member, each arm of said crosshead being connected with a stepped-down hollow crosshead member intermediate the ends of said last crosshead, and having a passageway thereto and so on for a plurality of stepped-down crosshead connections, each stepped-down crosshead having tubular connection with the crosshead from which it is stepped down, the passage through each crosshead being of one-half the cross-sectional area of that in the crosshead from which it is stepped down, the ends of each final crosshead having terminal discharge outlets.

2. A fluid distribution system comprising a central supply pipe, a hollow crosshead member with which said supply pipe is connected midway of the ends of said crosshead member, each arm of said crosshead being connected near its outer end with a stepped-down hollow crosshead member midway of the ends of said last crosshead, and having a passageway thereto and so on for a plurality of stepped-down crosshead connections, each stepped-down crosshead having tubular connection at its middle with the crosshead from which it is stepped down, the passage through each crosshead being of one-half the cross-sectional area of that in the crosshead from which it is stepped down, the ends of each final crosshead having terminal discharge outlets.

3. A fluid distribution system comprising a central supply pipe, a hollow crosshead member with which said suply pipe is connected intermediate the ends of said crosshead member, each arm of said crosshead being connected with a stepped-down crosshead member intermediate the ends of said last crosshead, and having a passageway thereto and so on for a plurality of stepped-down crosshead connections, each stepped-down crosshead having tubular connection with the crosshead from which it is stepped down, each final crosshead member having discharge nozzles, the cross-sectional area of the passageways in the successive downwardly stepped crossheads being diminished in arithmetical proportion and the number of passages being increased in arithmetical proportion, whereby the combined cross-sectional area of the passages in all the crossheads of any one degree is equal to the combined cross-sectional area of the passages in all the crossheads of any other degree.

4. A fluid distribution system comprising a central supply pipe, a hollow crosshead member with which said supply pipe is connected midway of the ends of said crosshead member, each arm of said crosshead being connected near its outer end with a stepped-down crosshead member midway of the ends of said last crosshead, and having a passageway thereto and so on for a plurality of stepped-down crosshead connections, each stepped-down crosshead having tubular connection at its middle with the crosshead from which it is stepped down, the ends of each final crosshead member having downwardly extending nozzles parallel with each other at equal distances apart, the cross-sectional area of the passageways in the successive downwardly stepped crossheads being dimished in arithmetical proportion and the number of channels being increased in arithmetical proportion, whereby the combined cross sectional area of all the crossheads in each series is equal to the combined cross sectional area of all the passages in each other series, and the several subdivided streams flow through different channels to the final discharge nozzles.

5. A fluid distribution system comprising a central supply pipe, a hollow crosshead member with which said supply pipe is connected midway of the ends of said crosshead member, each arm of said crosshead being connected near its outer end with a stepped-down hollow crosshead member midway of the ends of said last crosshead, and having a passageway thereto and so on for a plurality of stepped-down crosshead connections, each stepped-down crosshead having tubular connection at its middle with the crosshead from which it is stepped down, the passage through each crosshead being of one-half the cross-sectional area of that in the crosshead from which it is stepped down, the ends of each final crosshead having terminal discharge outlets, all of the discharge terminals being at equal distances from the point of first subdivision.

In testimony whereof I affix my signature.

RUDOLF SYKORA.